(No Model.) 3 Sheets—Sheet 1.
W. B. F. ELPHINSTONE & C. W. VINCENT.
DYNAMO ELECTRIC MACHINE.
No. 288,042. Patented Nov. 6, 1883.
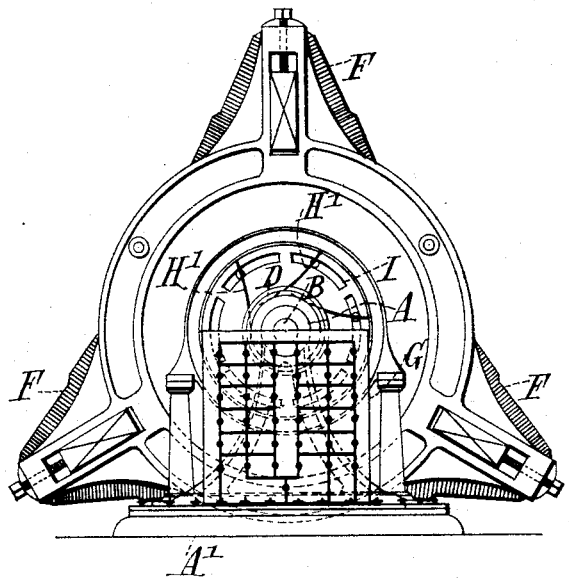
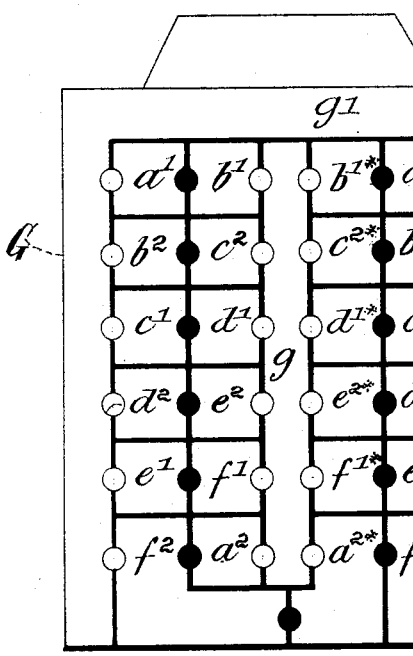
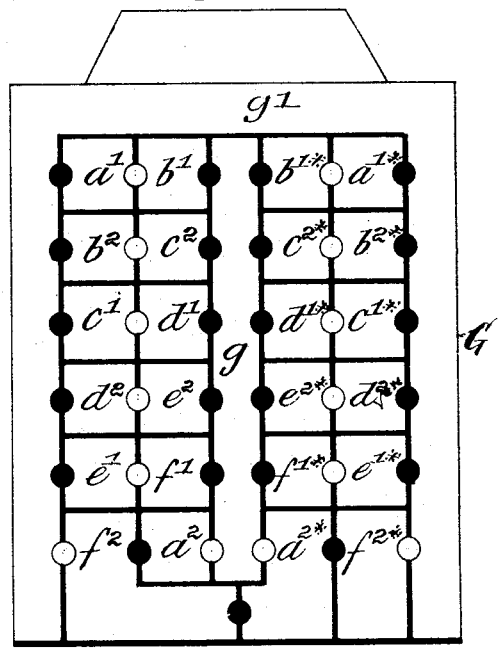

(No Model.) 3 Sheets—Sheet 2.
W. B. F. ELPHINSTONE & C. W. VINCENT.
DYNAMO ELECTRIC MACHINE.
No. 288,042. Patented Nov. 6, 1883.
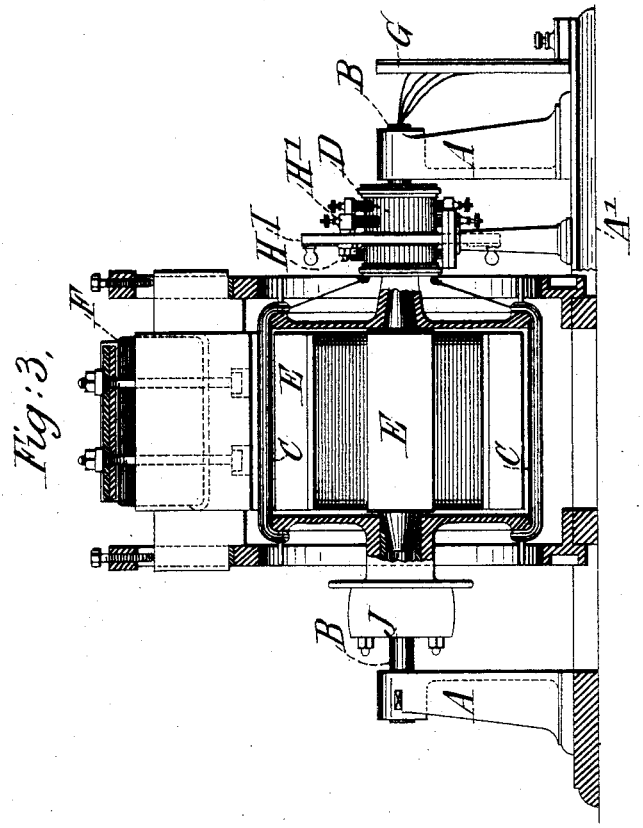
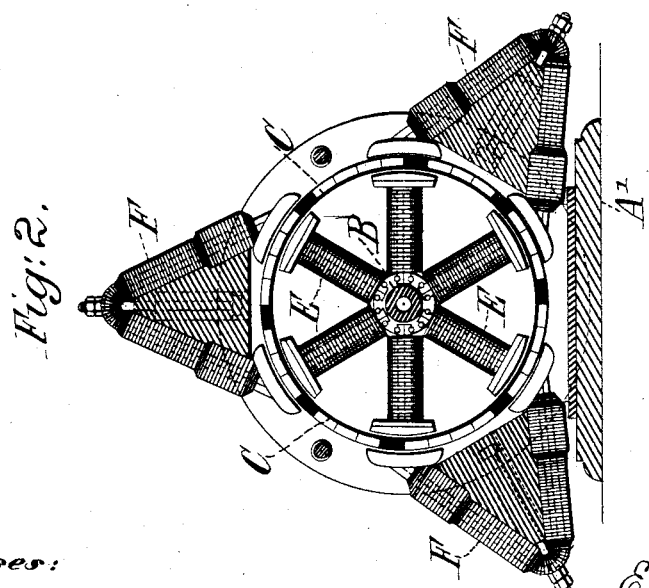

(No Model.) 3 Sheets—Sheet 3.
W. B. F. ELPHINSTONE & C. W. VINCENT.
DYNAMO ELECTRIC MACHINE.
No. 288,042. Patented Nov. 6, 1883.
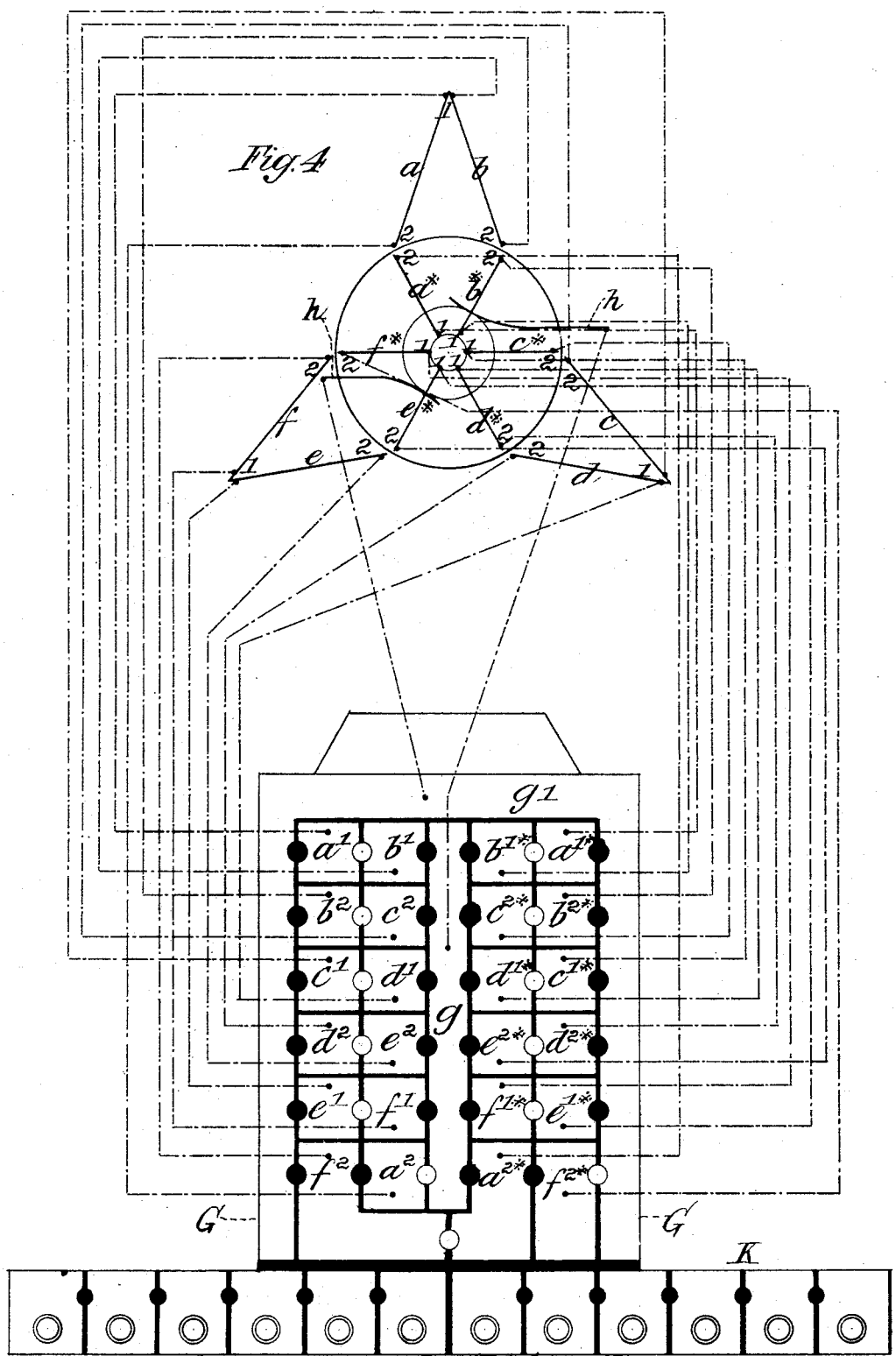

UNITED STATES PATENT OFFICE.

WILLIAM B. F. ELPHINSTONE, OF CARBERRY TOWER, MUSSELBURGH, SCOTLAND, AND CHARLES W. VINCENT, OF HOLLOWAY, COUNTY OF MIDDLESEX, ENGLAND.

DYNAMO-ELECTRIC MACHINE.

SPECIFICATION forming part of Letters Patent No. 288,042, dated November 6, 1883.

Application filed November 17, 1882. (No model.)

*To all whom it may concern:*

Be it known that we, WILLIAM BULLER FULLERTON ELPHINSTONE, (Baron Elphinstone,) of Carberry Tower, Musselburgh, Scotland, and CHARLES WILSON VINCENT, of Holloway, in the county of Middlesex, England, have invented new and useful Improvements in Dynamo-Electric Machines, of which the following is a specification.

The object of this invention is so to arrange dynamo-electric machines that under greatly-varying circumstances they will admit of being worked economically as respects the power used to impart rotary motion thereto. We have found, in working our dynamo-electric machine for which we obtained British patents dated, respectively, January 27, 1879, and July 13, 1880, that when the maximum amount of work which it is calculated to perform is put upon it in the external circuit the greatest economy in respect of the expenditure of power is observable. This is due to the small percentage of internal resistance which exists in comparison with the external resistance. On reducing the amount of work in the external circuit the proportion of the total power employed in overcoming the internal resistance of the machine was increased, and this in the reverse proportion to the reduction of the efficient work performed. This effect is due to the internal resistance of the machine being a constant quantity, although the efficient work outside is caused to vary. With the object of securing economical working, dynamo-machines have hitherto been constructed specially for the work required to be performed, the prevalent belief being that to secure this result it was necessary to work them near or up to their highest capacity. In order, however, to render these machines, like motive-power engines, capable of working economically under varying circumstances—for example, to maintain indifferently lamps connected in series or single parallels, or one hundred or five hundred lamps in a series, in single groups or parallels, as circumstances may require—we propose to divide up the field and send separate and distinct currents through groups of coils, or through each coil, as circumstances may require, in place of connecting all the coils of the field-magnets together, as heretofore, whereby one unalterable course of the exciting-current was provided, and by this means to modify the resistance so as to suit the work in hand. For this purpose we bring the terminals of each coil of the field-magnets to a grouping-tablet, to which, also, we connect the ends of the wires that serve to convey the exciting-current to the field.

In the accompanying drawings we have shown in side elevation at Figure 1, in cross-section at Fig. 2, and in longitudinal section at Fig. 3 our dynamo-electrical machine so modified as to secure thereby the above-mentioned results. Figs. 4, 5, and 6 are diagrams of grouping-tablet and circuits.

A A are cast-iron standards bolted to a bed-plate, A', also of cast-iron. Mounted in these standards A A is a fixed axle, B, on which is mounted loosely an armature-drum, C, carrying on its periphery coils or hanks of insulated wire, the ends of which coils are led down to a commutator, D. Situate within the drum, and fitted to the fixed axle B, are six radial arms, E, coiled with insulated wire, so as to constitute them six electro-magnets. Corresponding with these electro-magnets E are six external electro-magnets, F, which form, with the internal magnets, fields of force which the hanks carried by the armature-drum are in its rotation caused to cut. The ends of each coil of the external and internal field-magnets are led to a grouping-tablet, G, situate, for convenience, in front of one of the standards A, the use of which will be presently explained.

The commutator D may be supposed to represent a double commutator, the armature being furnished with two sets of coils, the terminals of one set going to one part of the commutator and the terminals of the other set of coils going to the other part of the commutator. When this arrangement is adopted, two sets of brushes or rubbers, H H', are required, the one set, H, serving to feed the field, and the other set, H', to collect and transmit the currents to the lamps or other work in hand. These brushes are carried by an adjustable ring, I, which is supported by standards on the bed-plate of the machine.

J is a driving-pulley on the hub of the armature-drum, and through it rotary motion is communicated to the drum by a band from a prime mover.

We will now proceed to explain in detail how the results which our invention is intended to secure are obtained.

It has been stated that the terminals of the coils of the several field-magnets are connected with a grouping-tablet, G. This is illustrated in the diagram Fig. 4, where the outer field-magnets are marked with the letters $a\ b\ c\ d\ e\ f$ and the inner field-magnets $a^\times\ b^\times\ c^\times\ d^\times\ e^\times\ f^\times$. The grouping-tablet may be described as consisting of a slab of insulating material, and carrying on its face a number of pairs of brass plates corresponding to the number of magnets forming the field. These plates are arranged in two sets, the one set being coupled up with the external and the other set with the internal field-magnets. The connection of these plates with their respective magnets we have indicated by giving to them similar letters of reference, distinguishing by numbers which pole of each magnet is connected with its respective plate. Thus the pole 1 of the magnet $a$ will be connected with the plate $a'$, and the pole 2 of the same magnet will be connected with the plate $a^2$. Similarly the pole 1 of the magnet $a^\times$ is connected with the plate $a^{\times\prime}$, and the pole 2 of the magnet $a^\times$ is connected with the plate $a^{\times 2}$, and so on throughout the two series. These series of plates, all insulated the one from the other, are divided by a brass strip, $g$, and they are surrounded on three sides by an insulated brass strip, $g'$. This strip is connected by a wire with one of the brushes $h$, and the insulated strip $g$ is similarly connected with the other brush, $h$. Thus, when the machine is set to work, the induced exciting-current intended for the field will be conducted to the grouping-tablet G, whence it may be delivered to the field-magnet coils in the order best suited for the work in hand.

The diagram Fig. 4 shows a number of holes made in the insulating-slab between the pairs of plates and the strips $g$ and $g'$, which lie parallel thereto. These holes are intended to receive metal plugs, to establish metallic contact where desired. Supposing, now, it is required to obtain a current of maximum intensity, we couple up the magnet-coils, as indicated in the diagram Fig. 4, where the white spots indicate the inserted plugs, the black spots serving to show the vacant holes. When the plates and strips are put into metallic communication, as in Fig. 4, the course of the current will be as follows: The current, entering by the strip $g$, will pass to the plate $a^2$, thence through the coil of the magnet $a$, and back to the plate $a'$. From this plate it will pass to the plate $b'$, thence around the magnet $b$, back to the plate $b^2$. From this plate it will pass by the contact-plug to the plate $c^2$, around the magnet $c$, back to the plate $c'$, and so on through the series of plates and magnet-coils until the current reaches the last plate of the outside series, $f^2$, which plate is made L-shaped to extend past the plate $a^2$. Here it reaches a lateral extension of the plate $a^{\times 2}$ of the inner series of electro-magnets, and being coupled to that plate by a metallic plug, the current passes to that plate, and thence through the coil of the electro-magnet $a^\times$. From this magnet the current passes to the plate $a^{\times\prime}$, and thence in consecutive order through the coils of all the internal magnets until it passes from the coil of the magnet $f^\times$ to the plate $f^{\times 2}$. As this plate is connected by a metallic plug with the strip $g'$, the current will pass to that strip, and thence through the wire which connects it with a brush, $h$, thus completing the circuit. This mode of coupling up permits of the exciting-current passing in the ordinary manner through the field, and is effective for insuring the full efficiency of the machine when the maximum resistance in the field-magnets is required. Supposing, now, it is desired to reduce the resistance in the field-magnets to meet a varied condition of the work to be performed, we couple up our metallic plates and strips, as illustrated at diagram Fig. 5, where it will be seen that each pair of plates is in direct communication with the strips $g$ and $g'$. Thus the current, entering at $g$, will pass simultaneously by the plates $b'\ c^2\ d'\ e^2\ f'\ a^2$ to their respective magnets, thence back to the plates $a'\ b^2\ c'\ d^2\ e'\ f^2$ to the strip $g'$, and so to the brush, by which the circuit is completed. Similarly the current from the strip $g$ will be divided up among the plates $a^{\times\prime}$ to $f^{\times 2}$ of the inner field-magnets. By thus coupling up the terminals on the grouping-tablet G, the resistance of the field-magnets will be reduced to a minimum, and the motive force employed for driving the machine will be proportionately efficiently employed in producing currents for external work. A further and most important advantage consequent on this mode of reducing the resistance is that when half or three-fourths of the number of lamps in a circuit are thrown out of use the ratio of the internal resistance of the machine to the work performed will remain unaltered, and consequently the motive power required to drive the machine may be reduced as the external work of the machine is reduced.

The diagram Fig. 6 illustrates a mode of coupling whereby the exciting-current is sent through the group of external magnets in series and through the group of internal magnets in series. Thus the resistance is very greatly increased as compared with Diagram 5 and is reduced to one-fourth as compared with Diagram 4. Comparing Diagram 6 with Diagram 4, it will be seen that this change in the working of the machine is effected by simply withdrawing the metallic plug which couples the plate $f^2$ with the plate $a^{x2}$, and connecting these two plates by metallic plugs, the one, $a^{x2}$, with the strip $g$, and the other, $f^2$, with the strip $g'$.

The brushes $H'$ may conveniently be connected with a grouping-tablet such as that shown at K, Fig. 4, which, being provided with plugs, will facilitate the coupling up of the brush-wires for intensity or quantity to suit the work in hand.

In explaining our invention we have referred to a machine in which the exciting-current is obtained from a special series of coils or hanks on the armature. We may, however, obtain the exciting-current from one of the main circuits, or from a shunt in the well-known manner, or from a source distinct from the machine to be excited; but the current, however derived, will be conducted to the grouping-tablet G, or its equivalent, and distributed through the magnetic field, in the manner above explained, to suit the work in hand.

From the foregoing it will be understood that the application of the invention is not limited to the form of dynamo-electric machine shown in the drawings, but may be applied wherever the field contains two or more magnets.

Having now set forth the nature of our invention, we may remark that we are aware that it has been proposed to arrange in dynamo-electric machines furnished with compound tubular electro-magnets the wires of the coils so that they may, at the option of the attendant, be changed from intensity to quantity or from quantity to intensity; but dynamo-machines thus constructed admit of only these two changes, and present this further disadvantage that whatever change is made in the resistance in the coils of the field-magnets is made also in the outside or working circuits, and these circuits are broken whenever such changes are made. Besides these disadvantages, the cost of construction is considerably increased. By our arrangement, however, not only is the cost of constructing the field-magnets unaffected, but we are enabled to make a great variety of changes in the producing power of our machine from a minimum, consequent on charging one of the field-magnets only, to a maximum, consequent on charging the whole of the field-magnets in quantity. Between these two points we can effect any change of combination rapidly and without breaking or otherwise interfering with the outside or working circuit or circuits; and we can therefore adjust the amount of electro-motive force, so as to exactly meet the requirements of the lamps or other work in hand.

We therefore claim as our invention and desire to secure by Letters Patent—

1. The combination, with the source of the exciting-current for the field-magnets of a dynamo-electric machine, of a grouping-tablet or its equivalent in electrical connection with said source, and independent of the main circuit, and in which the coils of the several field-magnets have their terminals, such terminals being so arranged as to admit of their being connected singly with the source of supply, or coupled up in series or groups for the purpose of adjusting the resistance of the field-magnets to suit the work in hand, substantially as herein described.

2. In a dynamo-electric machine, the combination of the field or fields of separate magnets or magnets wound with distinct wires and independent of the main circuit, and a grouping-tablet or its equivalent, providing for the exciting-current being passed around said magnets singly or in groups directly from a common source, without affecting the outside circuit, substantially as described.

ELPHINSTONE.
CHAS. W. VINCENT.

Witnesses to the signature of William Buller Fullerton Elphinstone, (Baron Elphinstone:)

JOSEPH BARFORD,
   *Carberry Tower, Musselburgh, Scotland.*
H. K. WHITE,
   *Chancery Lane, London.*

Witnesses to the signature of Charles Wilson Vincent:

H. K. WHITE,
GEO. CARTLE,
   *Both of Chancery Lane, London.*